(12) United States Patent
Su et al.

(10) Patent No.: US 8,937,030 B2
(45) Date of Patent: Jan. 20, 2015

(54) PREPARATION OF PEROVSKITE NANOCRYSTALS VIA REVERSE MICELLES

(75) Inventors: Kai Su, Harrison, NJ (US); Nan-Loh Yang, Staten Island, NY (US)

(73) Assignee: Research Foundation of the City University of New York, New York, NY (US)

( * ) Notice: Subject to any disclaimer, the term of this patent is extended or adjusted under 35 U.S.C. 154(b) by 971 days.

(21) Appl. No.: 12/602,808

(22) PCT Filed: Oct. 2, 2007

(86) PCT No.: PCT/US2007/080209
§ 371 (c)(1),
(2), (4) Date: Dec. 3, 2009

(87) PCT Pub. No.: WO2008/153585
PCT Pub. Date: Dec. 18, 2008

(65) Prior Publication Data
US 2010/0171063 A1     Jul. 8, 2010

Related U.S. Application Data

(60) Provisional application No. 60/943,209, filed on Jun. 11, 2007.

(51) Int. Cl.
C04B 35/47    (2006.01)
B82Y 30/00    (2011.01)
C01G 23/00    (2006.01)
B01J 23/00    (2006.01)
B01J 23/02    (2006.01)
B01J 35/00    (2006.01)

(52) U.S. Cl.
CPC .............. B82Y 30/00 (2013.01); C01G 23/006 (2013.01); B01J 23/002 (2013.01); B01J 23/02 (2013.01); B01J 35/0013 (2013.01); C01P 2002/34 (2013.01); C01P 2002/72 (2013.01); C01P 2002/82 (2013.01); C01P 2002/85 (2013.01); C01P 2004/04 (2013.01); C01P 2004/64 (2013.01); Y10S 977/773 (2013.01); Y10S 977/70 (2013.01)
USPC ........... 501/137; 501/136; 502/340; 977/773; 977/700; 252/62.9 PZ; 252/519.12

(58) Field of Classification Search
CPC ...... B01J 23/02; B01J 23/002; B01J 35/0013; B01J 19/00; B82Y 30/00; C01G 23/006; C01P 2002/72; C01P 2002/82; C01P 2002/85; C01P 2002/34; C01P 2004/64; C01P 2004/04; C04B 35/468; C04B 35/47; H01B 1/02; H01L 41/18
See application file for complete search history.

(56) References Cited

U.S. PATENT DOCUMENTS 5,965,676 A * 10/1999 Anan et al. ...................... 526/88
6,413,489 B1 * 7/2002 Ying et al. ...................... 423/600
(Continued)

Primary Examiner — Melvin C Mayes
Assistant Examiner — Smita Patel
(74) Attorney, Agent, or Firm — Andrew Auerbach

(57) ABSTRACT

The present invention is directed to perovskite nanostructures of Formula $ABO_3$, wherein A and B represent one or more metals with A having a valence lower than B, to methods of making the perovskite nanostructures of Formula $ABO_3$ comprising their synthesis within and precipitation from reverse micelles, and the use of the perovskite nanostructures of Formula $ABO_3$ as capacitors, and their use in dynamic random access memory, electromechanics, and non-linear optics.

21 Claims, 9 Drawing Sheets

(56) References Cited

U.S. PATENT DOCUMENTS

| | | | |
|---|---|---|---|
| 7,223,378 B2 * | 5/2007 | Sterzel | 423/598 |
| 2005/0191708 A1 * | 9/2005 | Saul et al. | 435/7.1 |
| 2006/0045840 A1 * | 3/2006 | Chen et al. | 423/598 |
| 2007/0122101 A1 * | 5/2007 | Buretea et al. | 385/141 |

* cited by examiner

Fig. 4A
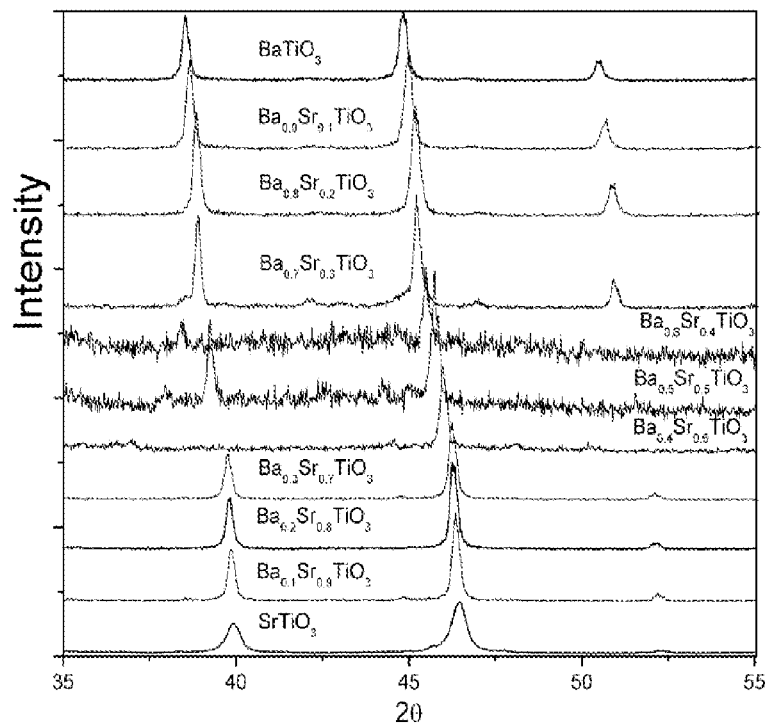
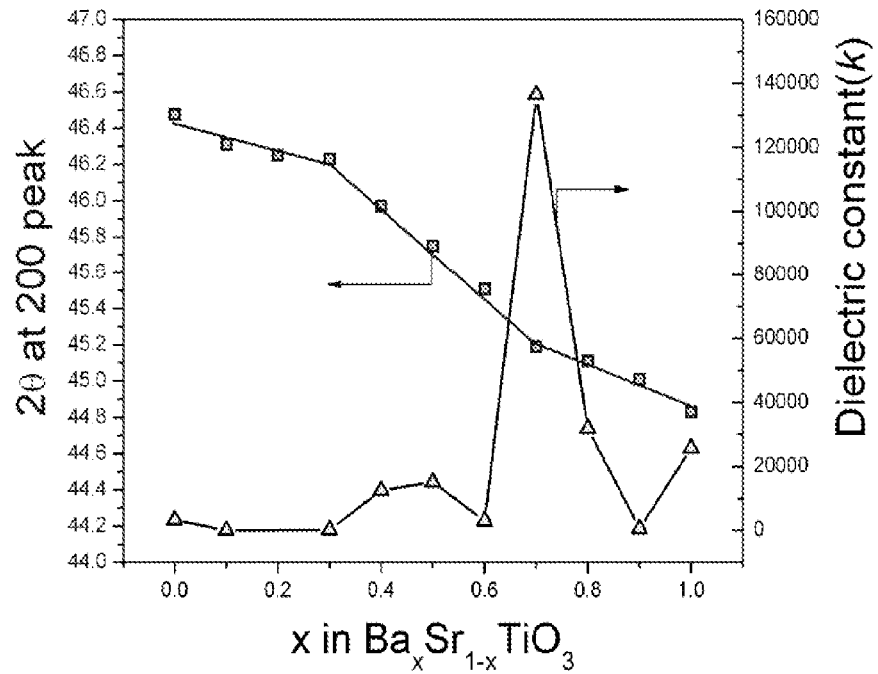
Fig. 4B

Scheme 1. Schematic route of the synthesis of BST $$TiCl_4 + HCl + 5OH^- \longrightarrow Ti(OH)_4\downarrow + 5Cl^- + H_2O \quad (1)$$

$$Ti(OH)_4 \cdot (H_2O)_2 + OH^- \rightleftharpoons [Ti(OH)_5 \cdot (H_2O)]^- + H_2O \quad (2)$$

$$[Ti(OH)_5 \cdot H_2O]^- + OH^- \longrightarrow [Ti(OH)_6]^{2-} + H_2O \quad (3)$$

$$[Ti(OH)_6]^{2-} + Sr^{2+} \longrightarrow SrTiO_3\downarrow + 3H_2O \quad (4)$$

Scheme 2: Proposed mechanism for the formation of STO nanocrystals

PREPARATION OF PEROVSKITE NANOCRYSTALS VIA REVERSE MICELLES

CROSS-REFERENCE TO PRIOR APPLICATION

This application is the U.S. National Phase of International Patent Application Ser. No. PCT/US07/80209, filed Oct. 2, 2007, which claims priority to U.S. Provisional Application Ser. No. 60/943,209 filed on Jun. 11, 2007, both of which are incorporated herein by reference in their entireties.

GOVERNMENT INTEREST

This invention was partially supported by the National Science Foundation through the MRSEC for Polymers at Engineered Interfaces and the New York State Office of Science Technology Academic Research, through the Center for Engineered Polymeric Materials.

FIELD OF THE INVENTION

The present invention generally relates to perovskite nanocrystals, methods of preparation thereof, their use as capacitors, and their use in dynamic random access memory, electromechanics, and non-linear optics.

BACKGROUND OF THE INVENTION

The remarkable physicochemical properties of perovskite materials, such as $BaTiO_3$ (BTO), $SrTiO_3$ (STO) and $Ba_xSr_{1-x}TiO_3$ (BST), have attracted scientific and technological research attention for many years.[1-3] The perovskite group of substances, a special group of mixed metal oxides, has unusual chemical and physical properties, for example catalytic, ferroelectric, pyroelectric, piezoelectric and dielectric behavior. As a result of these properties, perovskites are widely used, for example in piezoelectric layers and high-performance capacitors, high-temperature membranes for fuel cells and high-temperature conductors and in the areas of ferroelectricity, spin electronics, colossal magnetic resistance and nonlinear optical properties.

Since the properties of the perovskite depend substantially on the crystal chemistry, the production of pure, stoichiometric, homogeneous and crystalline perovskite materials having regulated crystallite sizes is of considerable scientific and technological interest. With the current advances in nanoscience, perovskite materials in the nanometer scale have become accessible through a variety of synthetic methods. Perovskite nanoparticles having high purity and lacking a history of thermal stress, are highly desirable as fundamental elements for nano-systems involving nano-capacitor and ferroelectrics such as in Ferroelectric Random Access Memories (FeRAM).[4,5]

BTO and STO are among the most studied perovskite ferroelectrics. In the past, most synthetic procedures for the preparation of perovskite crystals included high temperature (~1000° C.) sintering followed by annealing. Recently, extensive efforts have been focused on the establishment of moderate reaction conditions, especially lowering the synthetic temperature for high-quality perovskite nanocrystals.[5-14] Various methods for the synthesis of perovskite nanocrystals have been developed, including co-precipitation,[15,16] sintering of organometallic precursors,[17] hydrothermal and solvothermal methods,[8,9,18-21] sol-gel process,[6,22] and procedures mediated by molten composite-hydroxide.[12] Recent interests in nanoscience has led to extensive efforts focusing on obtaining BTO and STO nanocrystals based on the understanding gained from their bulk crystal counterparts.[4,23] The synthesis of BST nanocrystals with systematic composition variation has not been reported.

There have been several problems in preparing ferroelectric, for example perovskite, nanocrystals of high purity due to their high surface to volume ratio. For example, the impurity ions on the surface of the nanostructures may form a depolarization field preventing the tetragonal phase to grow.[4,24,25] The tetragonal polymorph is usually obtained upon cooling the products to room temperature after an ~1000° C. sintering. Although lower-temperature synthetic approaches of perovskite nanocrystals have been developed,[8,9,12] most of the synthetic temperatures were higher than the Curie temperature (~120° C.) of BTO. We reported recently our room temperature synthesis of ferroelectric nanocrystals with diameter from 6 to 12 nm using a bolaamphiphilic peptide ring as the template.[11] The peptide ring at the equatorial direction prevented the approach of impurity ions to the particle surface at the lateral directions providing an asymmetric environment conducive for the tetragonal polymorph to grow. A fungus-mediated biological route toward the synthesis of tetragonal barium titanate nanoparticles of sub-10 nm dimensions under ambient conditions was also reported.[13] Most recently, a bio-inspired process has been applied for the room-temperature synthesis of BTO from a bimetallic alkoxide precursor.[14]

Nonaqueous approaches have also been developed to synthesize nanocrystalline BTO, STO, and $Ba_{0.5}Sr_{0.5}TiO_3$ mixed-metal oxide using elemental alkaline earth metals as starting materials.[8] The resulting BTO and BST nanocrystals were found to be of cubic polymorph.[26] Based on a reaction between a metallic salt and a metallic oxide, nanometer-sized BTO and $Ba_{0.5}Sr_{0.5}TiO_3$ have also been synthesized in a solution of composite-hydroxide eutectic at ~200° C.[12]

BTO/STO artificial superlattices in thin films have been fabricated by pulsed laser deposition (PLD) on many substrates.[27] PLD methods can fabricate of BTO/STO superlattice with stacking periodicity varying from 1:1 to 125:125. In X-ray diffraction (XRD), the BTO/STO superlattics showed both BTO and STO characteristic peaks, while BST solid solutions from solvothermal method.[8]

SUMMARY OF THE INVENTION

The novel methods of the present invention for fabricating perovskite nanostructures include:
a method of making nanostructures of a compound having formula $ABO_3$, wherein A and B represent one or more metals with A having a valence lower than B, the method comprising
  forming a solution comprising a plurality of aqueous phase micelles disposed in a non-aqueous continuous phase with one or more water soluble compounds of B dissolved in the aqueous phase micelles;
  adding one or more water soluble compounds of A; and
  adding a water soluble inorganic base to precipitate the compound having formula $ABO_3$.

In some embodiments A comprises $A^1$ and $A^2$ and $A^1$ and $A^2$ are metals, and B comprises $B^1$ and $B^2$ and $B^1$ and $B^2$ are metals, such that the compound of Formula $ABO_3$ is represented by the Formula $A^1_{1-x}A^2_xB^1_{1-y}B^2_yO_3$, wherein $0 \leq x < 1$ and $0 \leq y < 1$ and A comprises metal $A^1$ and, if $x>0$, metal $A^2$ and B comprises metal $B^1$ and, if $y>0$, metal $B^2$.

In some embodiments of the methods for fabricating perovskite compounds of Formula $ABO_3$, the solution comprising a plurality of aqueous phase micelles comprises
  (a) a non-aqueous continuous phase comprising one or more non-polar solvents, (c) an emulsifier,
(d) a co-emulsifier,
(e) one or more water soluble compounds B having the Formula $B^{m+}X_m$ or hydrates thereof, wherein
$B^{m+}$ is a metal B,
m represents the valency of the metal B, and
each X is independently an anion capable of imparting water solubility to the compound of formula $B^{m+}X_m$; and
(e) one or more water soluble compounds A having the Formula $A^{n+}X_n$ or hydrates thereof, wherein
$A^{n+}$ is a metal A,
n represents the valency of the metal A, and
each X is independently an anion capable of imparting water solubility to the compound of formula $A^{n+}X_n$;
and wherein the solution prior to adding the water soluble inorganic base has a pH of from 6.8 to 7.2.

In some embodiments of the methods for fabricating perovskite compounds of Formula $ABO_3$, the methods further comprise:
(1) providing the non-aqueous continuous phase;
(2) providing an aqueous phase comprising the one or more compounds of Formula $B^{m+}X_m$ or hydrates thereof;
(3) combining the non-aqueous continuous phase and the aqueous phase to form the solution;
(4) adding the emulsifier to the non-aqueous continuous phase, the aqueous phase, or the solution;
(5) adding the co-emulsifier to the non-aqueous continuous phase, the aqueous phase, or the solution; and
(6) adding the one or more metals $A^{n+}X_n$ or hydrates thereof to the solution resulting from steps (1)-(5).

In a further embodiment of the present invention, the novel method for fabricating perovskite compounds of Formula $ABO_3$ can further comprise:
separating the precipitated nanostructures from the solution and washing the separated nanostructures to remove impurities.

In yet a further embodiment of the present invention, the novel method for fabricating perovskite compounds of Formula $ABO_3$ can further comprise:
one or more polyelectrolytes, one or more conducting polymers, or a mixture of one of more polyelectrolytes and one or more conducting polymers.

The novel methods of the present invention for fabricating perovskite nanostructures can be used to fabricate high purity nanostructures and nanocrystals having a size of from about 5 nm to about 500 nm, optionally, of uniform size distribution.

The novel methods of the present invention for allow for fabricating perovskite nanostructures without the addition of ligands and other organic additives for controlling the particle size and for maintaining the particle stability. In some embodiments of the present invention, the methods are free of halogens.

The perovskite nanostructures fabricated according to the methods of the present invention can be used in piezoelectric layers and as high-performance capacitors, in high-temperature membranes for fuel cells and high-temperature conductors, and as ferroelectrics such as in Ferroelectric Random Access Memories (FeRAM).

In some embodiments, the perovskite nanostructures fabricated according to the methods of the present invention comprise one or more compounds of Formula $ABO_3$, wherein A and B represent one or more metals with A having a valence lower than B, wherein the nanostructures have a size of from 5 nm to 500 nm, and wherein the nanostructures have a dielectric constant of from 10,000 to 150,000.

BRIEF DESCRIPTION OF THE DRAWINGS

Non-limiting and non-exhaustive embodiments of the present invention are described with reference to the following drawings.

For a better understanding of the present invention, reference will be made to the following Detailed Description, which is to be read in association with the accompanying drawings, wherein:

FIG. 1 depicts five different X-ray diffraction (XRD) patterns of STO nanocrystals prepared according to the methods of the present invention.

FIG. 4 depicts the XRD and dielectric results for BTO, STO and BST nanocrystals prepared according to the methods of the present invention. FIG. 4(a) The XRD patterns for BTO, STO, and BST nanocrystals having varying ratios of Ba:Sr. FIG. 4(b) The shifting of 2θ value at 200/002 peaks and the static dielectric constants for BST with increasing $Ba^{2+}$ molar fraction. ■-2θ values in XRD; Δ-static dielectric constant values.

FIG. 5 depicts TEM images and electron diffraction patterns of BTO, STO and $Ba_{0.7}Sr_{0.3}TiO_3$ nanocrystals prepared according to the methods of the present invention.

FIG. 6 depicts TEM images of $Ba_{0.7}Sr_{0.3}TiO_3$ nanoparticles prepared according to the methods of the present invention, using different synthetic conditions.

DETAILED DESCRIPTION OF THE INVENTION

Figure 1A:
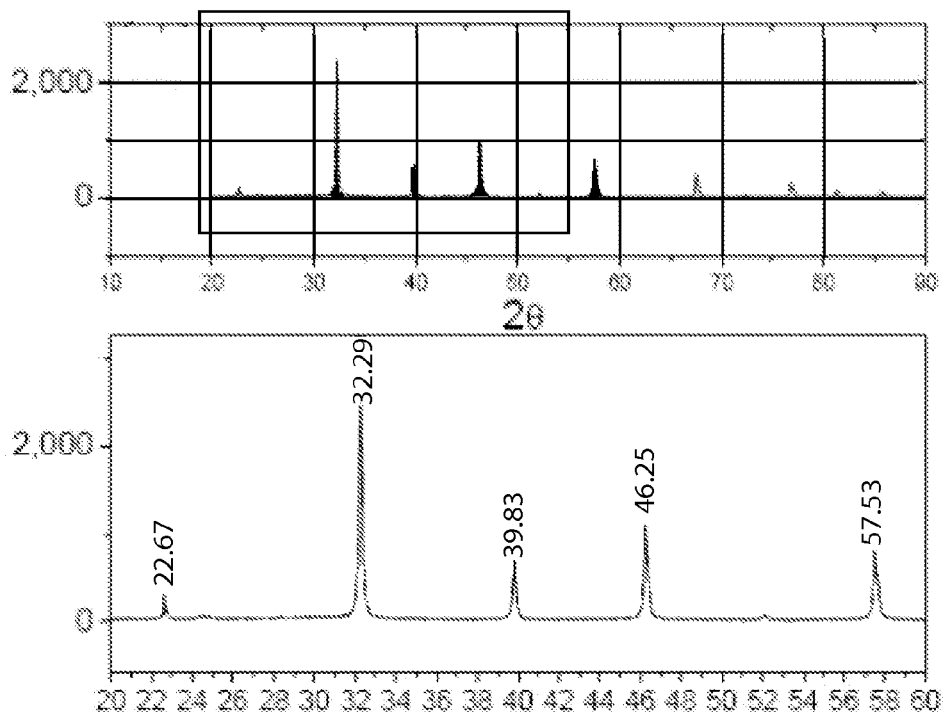
FIG. 1(a) depicts the XRD pattern of STO nanocrystals prepared according to Example 1.

Reverse micelles as efficient nanoreactors have been applied to the syntheses of nanocrystals.[28] The present invention is based on the discovery that perovskite nanostructures can be formed using reverse micelle technology without the addition of ligands and other organic additives for controlling the particle size and for maintaining the particle stability. Without wishing to be bound to any particular theory, the nanostructures are fabricated inside reverse micelle nanoreactors, and thus can be made using low temperatures. The reverse micelle technology can be performed on a benchtop at temperatures from about 5 to about 100° C., preferably from about 50 to about 100° C. and, in some embodiments, gives high-quality nanocrystalline materials with variable compositions (e.g., a series of samples with different Ba/Sr molar ratios increasing in steps of 0.1) leading directly to nanocrystals with very large dielectric constants. This finding is significant in providing, through a readily accessible synthetic route, novel particles with size down to about the 5 nm level for nanoelectronics.

By means of the method according to the invention, perovskite nanoparticles having high crystallinity and high purity can be produced by means of a simple synthesis. The desired perovskite material can advantageously be produced in high yields and high purity even without using additional ligands or organic additives, and the methods are amenable to large sale synthesis. Preferably, the perovskite nanostructures have a size of from 10 nm to 100 nm and a dielectric constant of 10,000 to 150,000. Most preferably, the dielectric constant is from 100,000 to 150,000.

In preferred embodiments, the nanostructures of the present invention comprise a compound of formula $ABO_3$ selected from the group consisting of $BaTiO_3$, $SrTiO_3$ and compounds of Formula $A^1_{1-x}A^2_xB^1_{1-y}B^2_yO_3$ wherein $A^1$ is Ba, $A^2$ is Sr, $B^1$ and $B^2$ are both Ti, $0.1 \leq x \leq 0.9$, and $y=1$.

The method according to the invention is a simple method for producing perovskite nanoparticles. Advantageously, the starting substances are commercially available so that a complicated synthesis of precursor substances is not required. The perovskite particles produced by the method according to the invention preferably have high crystallinity. The production method according to the invention therefore permits the provision of particularly finely divided crystalline perovskites which are desired, for example, for processing in ceramics or for use for further technological and scientific purposes.

In one particular embodiment using the methods of the present invention, we report here the first synthesis of $Ba_{0.7}Sr_{0.3}TiO_3$ nanocrystals, in the size range of 50 nm to 10 nm with very large dielectric constants ($1.4 \times 10^5$ at room temperature), using a facile synthetic route involving an open-bench system at 80° C. This synthesis is based on data from our preparation of nanocrystals of BTO, STO and BST with various compositions. When the methods of the present invention are used to synthesize BST nanocrystals, only characteristic peaks for the BST nanocrystals were observed, without any peaks for BTO and STO, indicating the atomic mixing nature of the $Ba^{2+}$ and $Sr^{2+}$ sites.

Perovskite nanoparticles of the formula $ABO_3$ can be produced using the method according to the invention. The term "perovskite" in the context of the present invention includes materials having a perovskite (i.e., $CaTiO_3$) structure or structure related to that of perovskite. In the formula $ABO_3$, A and B are both metals or mixtures of metals, wherein A is a metal of lower valency or the mixture of metals of lower valency than the metal or mixture of metals B. The metal or the mixture of metals A are preferably alkali metals, alkaline earth metals and/or transition elements. More preferably, the metal or the mixture of metals A are monovalent or divalent metals. In a particularly preferred embodiment, the metal or the mixture of metals A is selected from the group consisting of lithium, potassium, calcium, strontium, barium and lead. The use of strontium and barium is most preferred.

In the formula $ABO_3$, B is a metal of high valency or the mixture of metals of higher valency than the metal or mixture of metals A. The metal or the mixture of metals B are preferabley selected from the group consisting of the transition elements and metals of groups III and IV. In a preferred embodiment, the metal or mixture of metals B are selected from the group consisting of the tetravalent or pentavalent metals. Preferred metals B are niobium, zirconium, tin and titanium. Titanium is particularly preferred as the metal B.

In some embodiments, the perovskite compounds of Formula $ABO_3$ contain a mixture of two metals A, and/or a mixture of two metals B. In these embodiments, the Formula $ABO_3$ can be expanded to $A^1_{1-x}A^2_xB^1_{1-y}B^2_yO_3$, wherein $0 \leq x < 1$ and $0 \leq y < 1$. The Formula $A^1_{1-x}A^2_xB^1_{1-y}B^2_yO_3$ includes compounds of Formula $A^1_{1-x}A^2_xBO_3$ and $AB^1_{1-y}B^2_yO_3$. The present invention also contemplates higher order mixed-metal compounds of Formula $ABO_3$ such as compounds of Formula $AB^1_{1-(c+d)}B^2_cB^3_dO_3$, $A^1_{1-(a+b)}A^2_aA^3_bBO_3$, and $A^1_{1-(a+b)}A^2_aA^3_bB^1_{1-(c+d)}B^2_cB^3_dO_3$ wherein $0 \leq a < 1$, $0 \leq b < 1$, $0 \leq c < 1$ and $0 \leq d < 1$.

Specific examples of the compounds of Formula $ABO_3$ that are prepared according to methods of the present invention are $BaTiO_3$, $SrTiO_3$, $LiNbO_3$, $BaZrO_3$, $CaTiO_3$, and $PbTiO_3$, preferably $BaTiO_3$, $SrTiO_3$, and mixed metal peroviskites thereof including, for example, compounds of the Formula $Ba_xSr_{1-x}TiO_3$ including $Ba_{0.1}Sr_{0.9}TiO_3$, $Ba_{0.2}Sr_{0.8}TiO_3$, $Ba_{0.3}Sr_{0.7}TiO_3$, $Ba_{0.4}Sr_{0.6}TiO_3$, $Ba_{0.5}Sr_{0.5}TiO_3$, $Ba_{0.6}Sr_{0.4}TiO_3$, $Ba_{0.7}Sr_{0.3}TiO_3$, $Ba_{0.8}Sr_{0.2}TiO_3$ and $Ba_{0.9}Sr_{0.1}TiO_3$, preferably $Ba_{0.7}Sr_{0.3}TiO_3$.

For the purposes of the invention, the term "reverse micelle" is defined as a micelle in which a water component is on the inner portion of the micelle. Thus, the "hydrophilic" segment of each surfactant present in the reverse micelle is on the inner portion of the micelle, while the "lipophilic" segment of each surfactant is on the outer portion of the micelle.

In some embodiments of the present invention, the reverse micelle is formed using an emulsifier, preferably a non-ionic surfactant, and a co-emulsifier (e.g., Triton X-100). The emulsifier and co-emulsifier are combined with an aqueous phase and a non-aqueous continuous phase to form a biphase with a reverse micelle based emulsion. Without wishing to be bound to any particular theory, it is thought that all of the chemical reaction of the present methods occur in the reverse micelle, including the formation of, for example, a titanium hydroxide intermediate which forms upon the addition of an alkali hydroxide base to the reaction and which subsequently reacts with, for example, barium or strontium cations to produce the titanyl oxide-derived perovskite nanostructure.

The compound of Formula $B^{m+}X_m$ can be any synthetic precursor that contains one of the metals B in the compound of Formula $ABO_3$, provided that the compound is water soluble. The group X is can be any anion that allows the compound of Formula $B^{m+}X_m$ to be water soluble, including but not limited to halides, nitrates, sulfates, and phosphates. Preferred compounds of Formula $B^{m+}X_m$ are $TiCl_4$, $Ti(OH)_4$, and titanium alkoxides or hydrates thereof. Especially preferred is $TiCl_4$.

The compound of Formula $A^{n+}X_n$ can be any synthetic precursor that contains one of the metals A in the compound of Formula $ABO_3$, provided that the compound is water soluble. The group X can be any anion that allows the compound of Formula $B^{m+}X_m$ to be water soluble, including but not limited to halides, nitrates, sulfates, and phosphates. Preferred compounds of Formula $B^{m+}X_m$ are Ba and Sr halides. Especially preferred are $BaCl_2$ and $SrCl_2$ or hydrates thereof.

The inorganic base can be any inorganic base, but is preferably an inorganic base of Formula DOH, wherein D is an alkali or alkaline earth metal. Especially preferred is NaOH.

The inorganic base of Formula DOH is preferably added dropwise to the solution until the ratio of $OH^-$:B is from 1.5 to 2.5, preferably from 1.8 to 2.2, for example, the pH can be adjusted with NaOH until the ratio of OH⁻:Ti is 2.0.

The non-aqueous continuous phase can comprise any non-polar solvent or mixture of non-polar solvents, preferably solvents that have a higher boiling point than the reaction temperature at which the methods of the present invention are performed. However, the methods of the present invention also contemplate performing the reaction under pressure, which would allow for non-polar solvents with a boiling point lower than the reaction temperature to be used. Preferred solvents are alkanes and cycloalkanes. Especially preferred is cyclohexane.

The emulsifier can be any emulsifier that lends itself to the formation of reverse micelles. Preferred emulsifiers are nonionic surfactants. Any nonionic surfactant is suitable for the methods of the present invention, including, compounds produced by the condensation of alkylene oxide groups with an organic hydrophobic compound which may be aliphatic or alkyl aromatic in nature. Examples of useful nonionic surfactants include the polyethylene, polypropylene, and polybutylene oxide condensates of alkyl phenols; fatty acid amide surfactants, polyhydroxy fatty acid amide surfactants, amine oxide surfactants, alkyl ethoxylate surfactants, alkanoyl glucose amide surfactants, and alkylpolyglycosides. Specific examples of suitable nonionic surfactants include the Triton series surfactants, such as the Triton X series octylphenol ethoxylate surfactants; alkanolamides such as cocamide DEA, cocamide MEA, cocamide MIPA, PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, laureth-4, laureth-7, laureth-9, laureth-40, trideceth alcohol, C11-15 pareth-9, C12-13 Pareth-3, and C14-15 Pareth-11, alkylpolygluco sides such as decyl glucoside, lauryl glucoside, and coco glucoside. Especially preferred is Triton X-100 (polyoxyethylene octyl phenyl ether).

The co-emulsifier can be any co-emulsifier that lends itself to the formation of reverse micelles. Preferably the co-emulsifier is water immiscible. Especially preferred co-emulsifiers are alcohols that are immiscible with water, including n-butanol.

The perovskite nanostructure fabricated according to the methods of the present invention have a size of from about 5 nm to about 500 nm, preferably from about 10 nm to about 100 nm. Especially preferred are nanostructures of uniform size distribution.

In one particular embodiment of the present invention, titanium tetrachloride, strontium chloride and barium chloride aquous solutions were used as starting materials without organic components to obtain high-quality, homogeneous, stoichiometric BST nanocrystals. The system consisted of a combination of four components to form reverse micelles: cyclohexane (non-aqueous continuous phase), an aqueous solution of the metal chlorides, triton X-100 (emulsifier) and n-butanol (co-emulsifier). The system remained stable and transparent up to the point of extensive condensation of hydroxy precursors. The nonionic surfactant is preferred in this embodiment because it allows for the optimization of pH for the formation of mixed-metal oxides without altering the micelle structure significantly. The preferred pH was determined to be that in which the molar ratio of OH⁻ to Ti⁴⁺ was approximately 2 (see Experimental Section).

The use of only inorganic substances in the methods of the present invention is of importance, for example, (1) so that the impurity ions can be readily removed from the final products by washing with water; (2) because total inorganic starting materials are preferred for the aqueous phase in the reverse micelle so that all the reactions are confined inside the nanoreactors; (3) it allows for the reaction temperature to be much lower than that of reported synthetic procedures for BST (e.g., of 80° C.); and (4) the same reverse micelle system can be used to make nanocomposites of BST with polyelectrolytes or conducting polymers by emulsion polymerizations in a one-pot method.[29]

Figure 7:
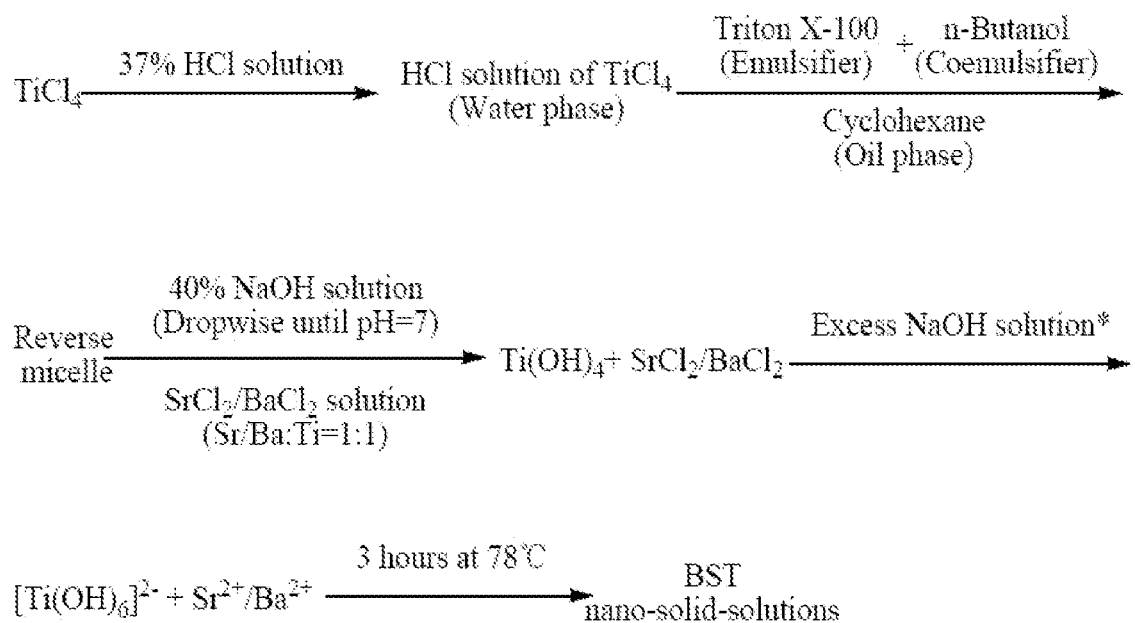
FIG. 7 (SCHEME 1) provides a reaction scheme for one embodiment of the present invention for the synthesis of $SrTiO_3$ (STO)

In preferred embodiments, a hydrochloric acid solution of $TiCl_4$ was used as the aqueous phase, and cyclohexane as the non-aqueous continuous phase. Triton X-100 and n-butanol were selected as the emulsifier and co-emulsifier. Without wishing to be bound to any particular theory, an example of one of the reactions that occurs in the reverse micelle to form the perovskite nanostructures of the present invention is schematically shown in FIG. 7 (Scheme 1) and addressed in the experimental section. The final BST powders produced according to FIG. 7 (Scheme 1) were characterized by X-ray diffraction for crystalline phase determination. Transmission electron microscope and electron diffraction were used to characterize the morphologies and crystalline structures of BST nanocrystals.

Figure 8:
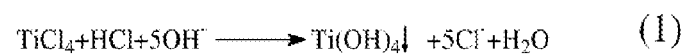
FIG. 8 (SCHEME 2) provides a reaction scheme for one embodiment of the present invention for the synthesis of $Ba_xSr_{1-x}TiO_3$ (BST).
Figure 8:
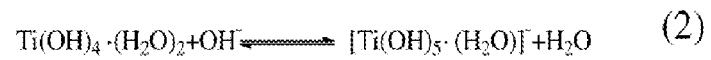
Figure 8:
Figure 8:
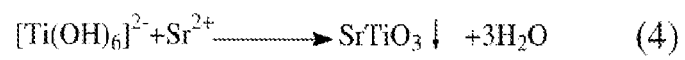

To delve into the synthetic mechanism, but without wishing to be bound to any particular theory, the synthesis of STO was used as an examplary case. The STO precipitate is likely to form via the following reaction scheme FIG. 8 (Scheme 2). Firstly, the hydrochloric acid solution of $TiCl_4$ reacted with NaOH in the reverse micelle. $Ti(OH)_4$ exists as hydrates, e.g. $Ti(OH)_4(H_2O)$, in water at the pH=7. When more NaOH was added into the water phase, equilibrium reactions occurred as shown in equation FIG. 8 (Scheme 2), equations (2) and (3). As soon as $[Ti(OH)_6]^{2-}$ species was formed, $Sr^{2+}$ reacted with it to produce STO, as shown in FIG. 8 (Scheme 2), equation (4)

Figure 1B:
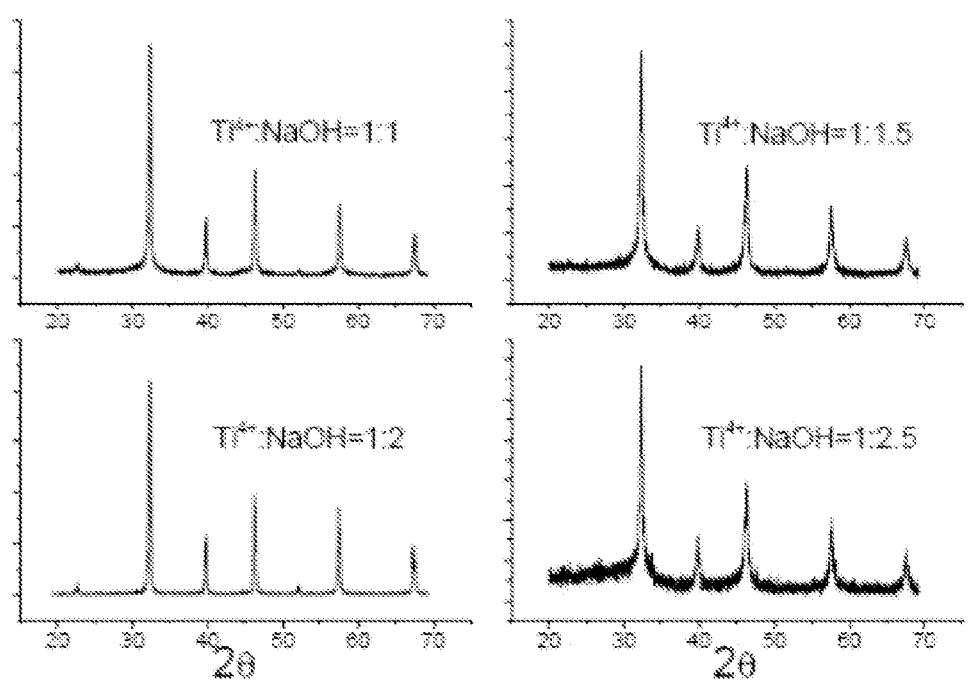
FIG. 1(b) depicts the XRD patterns of four different batches of STO nanocrystals prepared with different $Ti^{4+}$:NaOH ratios.
Figure 2:
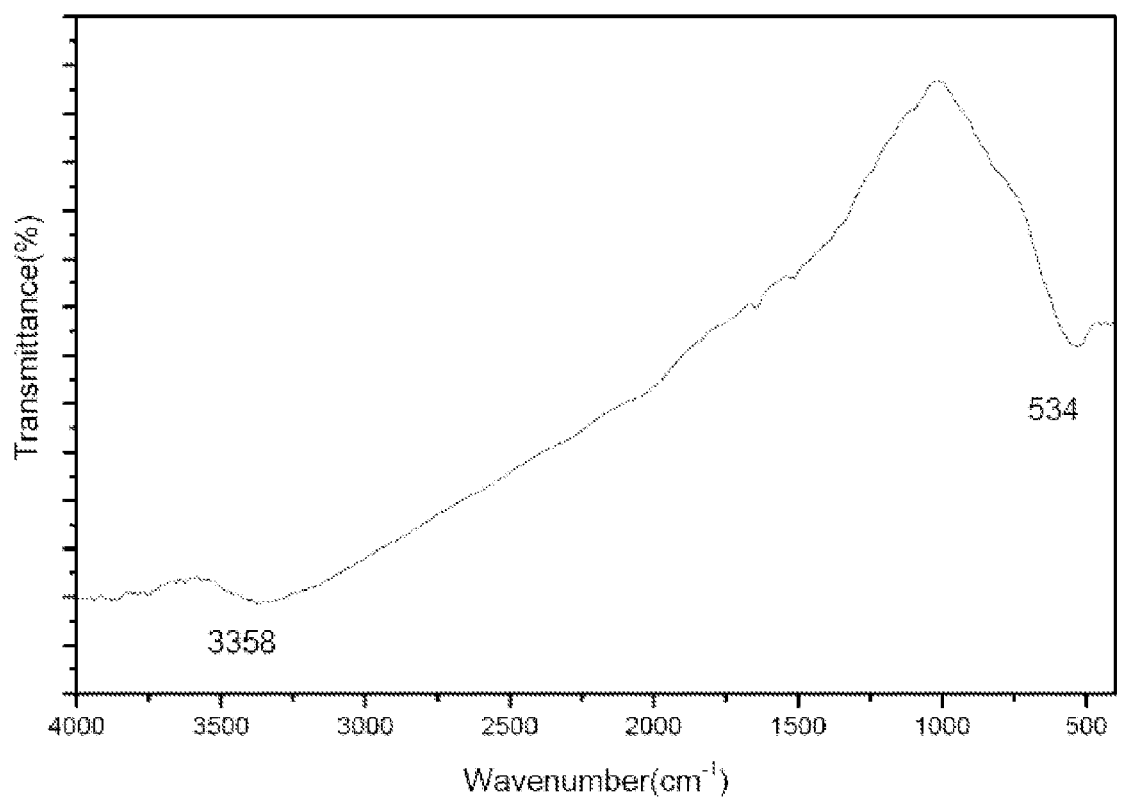
FIG. 2 depicts an FTIR spectrum of STO nanocrystals prepared according to the methods of the present invention.
Figure 3:
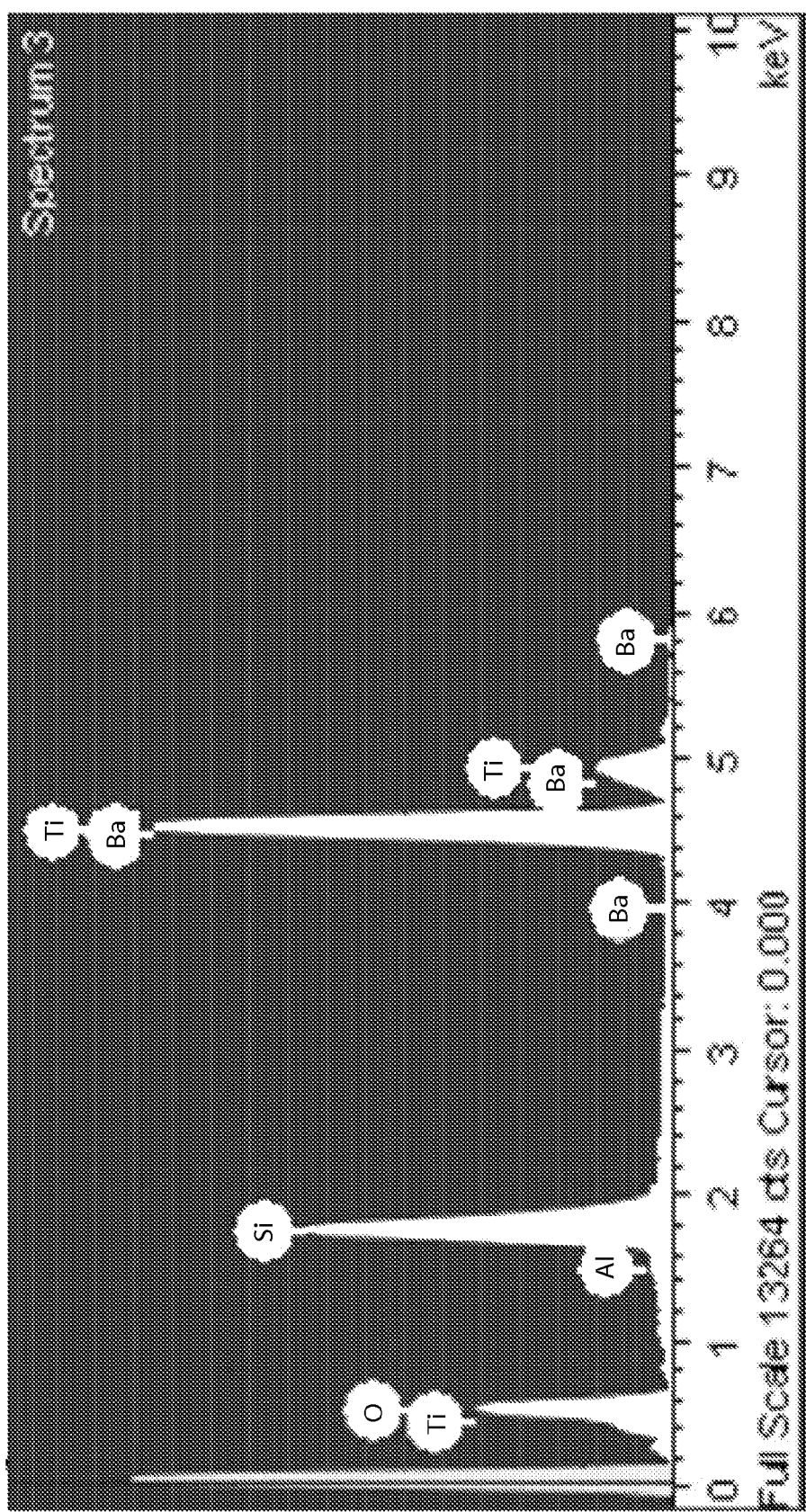
FIG. 3 depicts an EDS spectrum of BTO nanocrystals prepared according to the methods of the present invention.
Figure 5A:
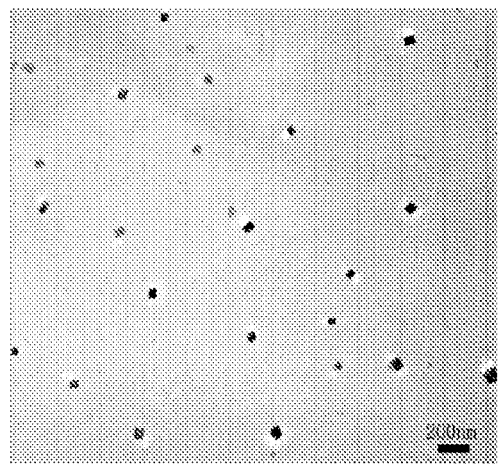
FIG. 5(a) depicts a TEM image of BTO.
Figure 5B:
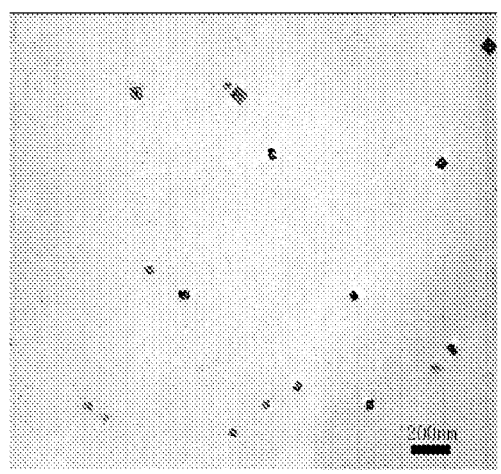
FIG. 5(b) depicts a TEM image of STO.
Figure 5C:
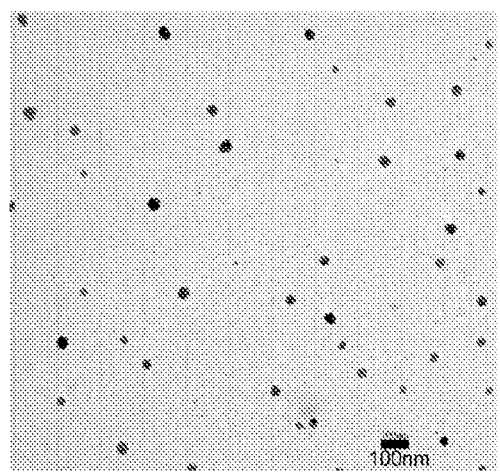
FIG. 5(c) depicts a TEM image of $Ba_{0.7}Sr_{0.3}TiO_3$.
Figure 5D:
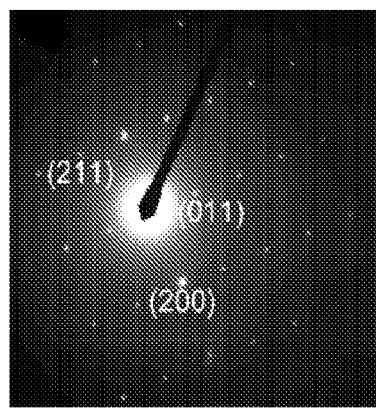
FIG. 5(d) depicts an electron diffraction pattern of BTO.
Figure 5E:
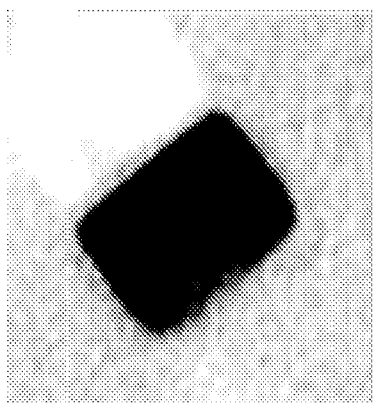
FIG. 5(e) depicts an electron diffraction pattern of STO.
Figure 5F:
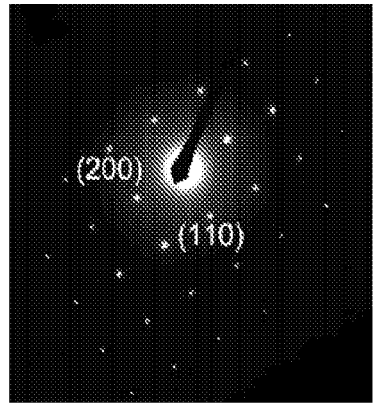
FIG. 5(f) depicts an electron diffraction pattern of $Ba_{0.7}Sr_{0.3}TiO_3$.
Figure 5G:
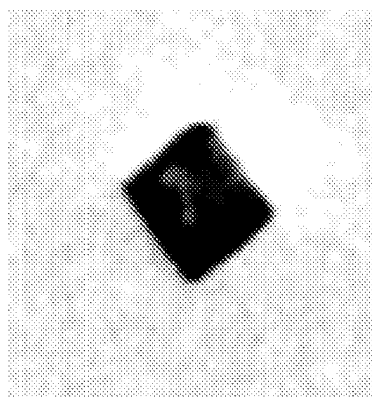
FIG. 5(g) depicts a TEM image of BTO at high magnification.
Figure 5H:
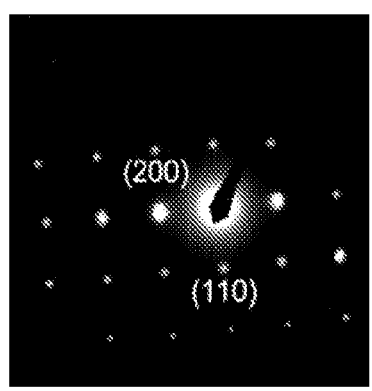
FIG. 5(h) depicts a TEM image of STO at high magnification.
Figure 5I:
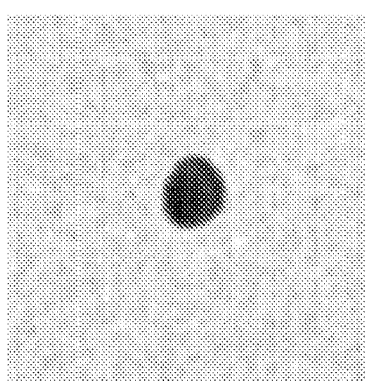
FIG. 5(i) depicts a TEM image of $Ba_{0.7}Sr_{0.3}TiO_3$ at high magnification.

In particularly preferred embodiments, the nanostructures synthesized using an open-bench method are nanocrystals of high quality based on data from XRD, fourier transform infrared (FTIR) spectroscopy, energy dispersive X-ray spectrometry (EDS) and TEM. FIG. 1(*a*) shows the XRD pattern of STO nanocrystals. No characteristic peaks from $SrCO_3$ or $TiO_2$ impurities were observed. The STO lattice parameters are in agreement with the data reported in the International Centre for Diffraction Database (JCPDS No. 35-734). The quality of the products from our synthetic and purification procedure was further established by FTIR and EDS. These analytical data (FIGS. 2 and 3) from our nanocrystals serve as examples for the high quality achievable by the methods of the present invention. For example, in the FTIR spectrum of STO (FIG. 2), there is no observable vibrational peaks from organic impurities. The absorption at 534 $cm^{-1}$ indicates the formation of Ti—O octahedra and the broad peak at 3358 $cm^{-1}$ reflects the absorption from surface hydroxyl groups. In the EDS analysis of BTO (FIG. 2), no detectable Cl or Na peaks were observed, indicating that $Cl^-$ and $Na^+$ ions were efficiently removed from the final products by thorough washing.

In particular embodiments of the present invention, the $Ba^{2+}/Sr^{2+}$ molar ratio in BST nanocrystals can be manipulated by controlling the amounts of, for example, $SrCl_2$ and $BaCl_2$ added to the biphase. The control of the $Ba^{2+}/Sr^{2+}$ molar ratio was demonstrated by the synthesis of a series of BST nanoparticles with the molar fractions of $Ba^{2+}$ varied in the steps of 0.1. The XRD of $Ba_xSr_{1-x}TiO_3$ (FIG. 4(*a*)) with the full range of compositions show single 200/002 peak for each composition, indicating the formation of true solid solution with atomic mixing of $Ba^{2+}$ and $Sr^{2+}$ rather than superlattice which would show separate BTO and STO peaks.[27] With the change in the composition of BST, the trend of 2θ for the 200/002 peak and the variation in dielectric constant are depicted in FIG. 4(b). The 2θ value decreased from 46.74 to 44.83 with increasing $Ba^{2+}$ molar fraction, indicating the lattice unit expanded from 3.904 to 4.039Å. The decrease of 2θ values for the series of BST nanocrystals shows three distinct regions (FIG. 4(b)). The highest rate of lattice expansion with increase in $Ba^{2+}$ takes place in the range of x=0.3 to 0.7. This is the first systematic investigation of BST with methodical composition variation.

As expected, the change of the features of XRD is most pronounced in the range near equal $Ba^{2+}$ and $Sr^{2+}$ compositions (x=0.4 to 0.6). In this region, the 111 peaks show much greater variation than the 200 peaks; the former plane is defined by periodicity involving less number of atomic positions than the latter, thus more sensitive to changes in $Ba^{2+}$/$Sr^{2+}$ composition ratios. At x=0.5, the XRD data showed a decrease in crystallinity with further deterioration at x=0.6. There is a conspicuous return to the previous level for high-quality crystals at x=0.7. From x=0.7 to pure BTO, a graduate change toward BTO peak positions for both 111 and 200 peaks was observed. As shown in FIG. 4(b), the room temperature static dielectric constant has a marked jump at x=0.7 to a high level of $1.4 \times 10^5$. This maximum was observed previously for bulk crystals[30-32] and in agreement with molecular dynamic calculation.[33] The very large dielectric constant observed indicates the tetragonal polymorph of the nanocrystal. In the low size range of 50 to 10 nm, XRD data can not be used to rule out the presence of cubic polymorph.[34]

The TEM images and electron diffraction patterns of BTO, STO, and $Ba_{0.7}Sr_{0.3}TiO_3$ nanocrystals are shown in FIG. 5. The BTO nanocrystals in this figure have an average size of 80 nm (FIG. 5(a) and FIG. 5(e)). Thus, bypassing the final high temperature sintering process typically required for the synthesis of perovskite structures and crystals avoided the formation of agglomerates. The electron diffraction pattern (FIG. 5(d)) also indicates that the synthesis gave directly high-quality nanocrystals. Both the shape in TEM and the spot matrix in the electron diffraction pattern support the preparation of single-crystalline BTO nanoparticles at a temperature as low as 80° C. FIG. 5(b) and FIG. 5(g) show the TEM of STO nanocrystals as non-agglomerated nanocubes with an average size of 70 nm Electron diffraction pattern with lattice indices (FIG. 5(f)) shows the single crystalline nature of STO nanocrystals. Unlike STO and BTO, the $Ba_{0.7}Sr_{0.3}TiO_3$ nanocrystals show rather uniform nanospheres in the TEM image (FIG. 5(c) and FIG. 5(i)), with an average diameter of 50 nm. The electron diffraction patterns (FIG. 5(d), FIG. 5(f), and FIG. 5(h)) are in agreement with XRD results.

Figure 6A:
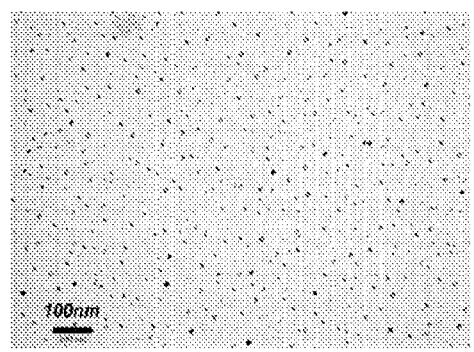
FIGS. 6(a)-(b) depict TEM images of $Ba_{0.7}Sr_{0.3}TiO_3$ nanoparticles prepared from a method wherein all aqueous contents equal to 0.5 of the original amount.
Figure 6B:
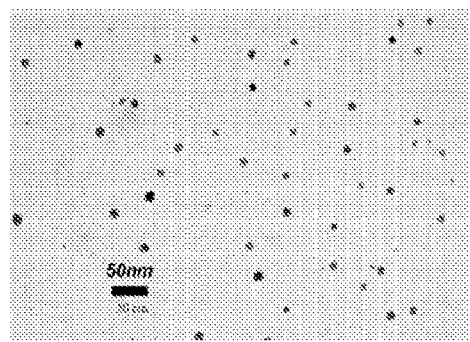
Figure 6C:
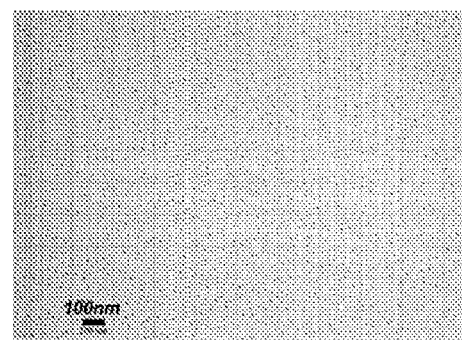
FIGS. 6(c)-(d) depict TEM images of $Ba_{0.7}Sr_{0.3}TiO_3$ nanoparticles prepared from a method wherein all aqueous contents equal to 0.25 of the original amount.
Figure 6D:
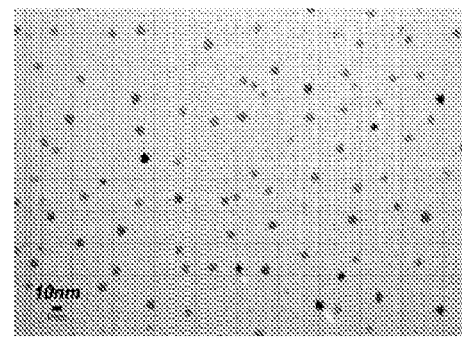

In particularly preferred embodiments, the preparation of $Ba_{0.7}Sr_{0.3}TiO_3$ nanocrystals with a very large dielectic constant was extended to still further lower size ranges, 20 to 10 nm based on, without wishing to be bound to any particular theory, fine tuning the size of the reverse micelles through changing the surfactant to water ratio. Particles in this low size range can have potential application to FeRAM. Keeping the non-aqueous continuous phase, emulsifier and co-emulsifier amounts constant, and changing the amount of the aqueous phase by ½ and ¼ led to uniform BST nanoparticles of smaller sizes: 15-20 nm in diameter from the system the ½ (FIG. 6(a) and FIG. 6(b)), and 5-10 nm in diameter from the ¼ (FIG. 5(c) and FIG. 6(d)).

In summary, an efficient method has been discovered for the synthesis of, for example, high-quality STO, BTO nanocrystals and BST nano-solid-solutions with variable compositions and size range. Preferably, the methods can be performed on an open-bench and the low temperature of the synthetic process represents nanocrystal formation below the Curie temperature of, for example, BTO (e.g., The 80° C.). This open-bench process allowed the direct, facile preparation of, for example, BST single-nano-crystals with very large static dielectric constants without the history of thermal stress. In particularly preferred embodiments of the invention, the reverse micelle method led to high-quality nanocrystals as supported by XRD, electron diffraction, TEM, FTIR and EDS data. The shifting of 2θ value at 200/002 peak reflects the increasing of the lattice unit dimension with increasing $Ba^{2+}$ molar fraction as expected. BTO and STO synthesized are, preferably, single crystals in cubic shape, while the $Ba_{0.7}Sr_{0.3}TiO_3$ nanocrystals are, preferably, in spherical shape. The size of, for example, BST nanoparticles can be readily tuned from ~50 nm to ~10 nm using the methods of the present invention. These findings can have significant impact for the development of FeRAM application. The methods of the present invention represent a significant contribution to the perovskite nanocrystal synthetic methodology. This new procedure does not require demanding conditions such as high temperature, high pressure, and inert environment and only involves handlings of common components.

Without further elaboration, it is believed that one skilled in the art can, using the preceding description, utilize the present invention to its fullest extent. The following examples are, therefore, to be construed as merely illustrative, and not limitative of the remainder of the disclosure in any way whatsoever.

EXAMPLE 1

Synthesis of BST Nanoparticles 6.39 g of hydrochloric acid (37%) solution containing 47% of $TiCl_4$ (99.9%) and 15 mL deionized (DI) water were mixed and used as the aqueous phase, and cyclohexane (99%, 23 g) as the oil continuous phase. Triton X-100 (labotary grade, 25 g) and n-butanol (99.4%, 28 g) were used as the emulsifier and co-emulsifier. The chemicals were then transferred to a 500 ml flask equipped with a stirrer, a thermometer, a dropping funnel and a reflux condenser. With stirring, a 40% NaOH (97%) solution was dropped into the flask until pH=7. Stoichiometric amount of $SrCl_2.6H_2O$, 99%, (or $BaCl_2.2H_2O$, 99%) was dissolved in DI water (25 mL) and then added into the flask dropwise under continuous stirring. Additional 40% NaOH aqueous solution with was then added dropwise into the colloid system until the ratio of $OH^-:Ti^{4+}$= 2:1. This reaction system was then kept at 78-80° C. for 3 hours prior to a centrifugation at 4000 rpm for 15 min The resulting sediment was redispersed in DI water using an ultrasonic bath. This centrifugation-redispersion cycle was repeated at least three times to remove emulsifiers and other ionic impurities. The final particles were dried under vacuum at 80° C. over night.

In the preparation of BST with different sizes, the amount of non-aqueous continuous phase, emulsifier and co-emulsifier were kept as a constant, all the aqueous contents were varied by a factor of either 0.5 or 0.25. The dried BST powders were characterized by X-ray diffraction (XRD, Philips PW3040) for crystalline phase determination. Transmission electron microscope (TEM, JOEL 1200 EX) and electron diffraction at an acceleration voltage of 100 kV were used to characterize the morphologies and crystalline structures of BST solid solutions. EDS studies were conducted on a LEO 1530 electron microscope combined with an Inca EDS Microanalysis Systems (Oxford Instruments). The dielectric constant measurements were conducted on a Novocontrol BDS 80 high-resolution broadband dielectric spectrometer with a sample holder cell (diameter: 19.21 mm; thickness: 0.27 mm).

The present invention is not limited in scope by the specific embodiments described herein. Indeed, various modifications of the invention in addition to those described herein will become apparent to those skilled in the art from the foregoing description and the accompanying figures. Such modifications are intended to fall within the scope of the appended claims. It is further to be understood that all values given in the foregoing examples are approximate, and are provided for purposes of illustration.

Patents, patent applications, publications, product descriptions, and protocols which are cited throughout this application are incorporated herein by reference in their entireties for all purposes. In case of conflict, the present specification controls.

REFERENCES

1. Chandler, C. D.; Roger, C.; Hampden-Smith, M. J. *Chem. Rev.* 1993, 93, 1205.
2. Pena, M. A.; Fierro, J. L. G. *Chem. Rev.* 2001, 101, 1981.
3. Hill, N. A. *J. Phys. Chem. B* 2000, 104, 6694.
4. Ahn, C. H.; Rabe, K. M.; Triscone, J. M. *Science* 2004, 303, 488.
5. Huang, L.; Chen, Z.; Wilson, J. D.; Banerjee, S.; Robinson, R. D.; Herman, I. P.; Laibowitz, R.; O'Brien, S. *J. Appl. Phys.* 2006, 100, 034316.
6. O'Brien, S.; Brus, L.; Murray, C. B. *J. Am. Chem. Soc.* 2001, 123, 12085.
7. Urban, J. J.; Yun, W. S.; Gu, Q.; Park, H. *J. Am. Chem. Soc.* 2002, 124, 1186.
8. Niederberger, M.; Garnweitner, G.; Pinna, N.; Antonietti, M. *J. Am. Chem. Soc.* 2004, 126, 9120.
9. Niederberger, M.; Pinna, N.; Polleux, J. *Angew. Chem., Int. Ed.* 2004, 43, 2270.
10. Mao, Y.; Banerjee, S.; Wong, S. S. *J. Am. Chem. Soc.* 2003, 125, 15718.
11. Nuraje, N.; Su, K.; Haboosheh, A.; Samson, J.; Manning, E. P.; Yang, N.-L.; Matsui, H., *Adv. Mater.* 2006, 18, 807.
12. Liu, H.; Hu, C.; Wang, Z. L. *Nano Lett.* 2006, 6, 1535.
13. Bansal, V.; Poddar, P.; Ahmad, A.; Sastry, M. *J. Am. Chem. Soc.* 2006, 128, 11958.
14. Brutchey, R. L.; Morse, D. E. *Angew. Chem., Int. Ed.* 2006, 45, 6564.
15. Wada, S.; Tsurumi, T.; Chikamori, H.; Noma, T.; Suzuki, T. *J. Cryst. Growth* 2001, 229, 433.
16. Xu, H. R.; Gao, L. *J. Am. Ceram. Soc.* 2003, 86, 203.
17. Arya, P. R.; Jha, P.; Ganguli, A. K. *J. Mater. Chem.* 2003, 13, 415.
18. Dutta, P. K.; Gregg, J. R. *Chem. Mater.* 1992, 4, 843.
19. Dutta, P. K.; Asiaie, R.; Akbar, S. A.; Zhu, W. *Chem. Mater.* 1994, 6, 1542.
20. Um, M. H.; Kumazawa, H. *J. Mater. Sci.* 2000, 35, 1295.
21. Mao, Y.; Banerjee, S.; Wong, S. S. *Chem. Comm.* 2003, (3), 408.
22. Frey, M. H.; Payne, D. A. *Chem. Mater.* 1995, 7, 123.
23. Fu, H.; Bellaiche, L. *Phys. Rev. Lett.* 2003, 91, 257601.
24. Junquera, J.; Ghosez, P. *Nature* 2003, 422, 506.
25. Dawber, M.; Chandra, P.; Littlewood, P. B.; Scott, J. F. *J. Phys.: Condens. Matter* 2003, (24), L393.
26. Petkov, V.; Gateshki, M.; Niederberger, M.; Ren, Y. *Chem. Mater.* 2006, 18, 814.
27. Lee, J.; Kim, L.; Kim, J.; Kim, Y.; Jung, D., in *Fundamental Physics of Ferroelectrics* 2002. American Institute of Physics: Washington D.C., 2002, p 178.
28. Pileni, M.-P. *Nat. Mater.* 2003, 2, 145.
29. Su, K.; Yang, N.-L. *Polym. Prep.* 2004, 45, 533.
30. Davis, L.; Rubin, L. G. *J. Appl. Phys.* 1953, 24, 1194.
31. Kisaka, S.; Ikegami, S.; Sasaki, H. *J. Phys. Soc. Jpn.* 1959, 14, 1680.
32. Hilton, A. D.; Ricketts, B. W. *J. Phys. D: Appl. Phys.* 1996, 29, 1321.
33. Tanaka, H.; Tabata, H.; Ota, K. i.; Kawai, T. *Phys. Rev. B* 1996, 53, 14112.
34. Yashima, M.; Hoshina, T.; Ishimura, D.; Kobayashi, S.; Nakamura, W.; Tsurumi, T.; Wada, S. *J. Appl. Phys.* 2005, 98, 014313.

What is claimed is:

1. A method of making nanostructures of a compound having formula $ABO_3$ produced, wherein A and B represent one or more metals with A having a valence lower than B, the method comprising
    forming a solution comprising a plurality of aqueous phase micelles disposed in a non-aqueous continuous phase with one or more water soluble compounds of B dissolved in the aqueous phase micelles;
    adding one or more water soluble compounds of A; and
    adding a water soluble inorganic base having $OH^-$ ions to precipitate the compound having formula $ABO_3$ where the $OH^-$: B molar ratio is from 1.5 to 2.5;
wherein the method was performed without a sintering step and the dielectric constant of nanostructures ranges from 20,000 to 150,000.

2. The method of claim 1, wherein A comprises $A^1$ and $A^2$ and $A^1$ and $A^2$ are metals.

3. The method of claim 1, wherein B comprises $B^1$ and $B^2$ and $B^1$ and $B^2$ are metals.

4. The method of claim 1, wherein the compound has the formula $A^1_{1-x}A^2_x B^1_{1-y}B^2_y O_3$, wherein $0 \leq x < 1$ and $0 \leq y < 1$ and A comprises metal $A^1$ and, if $x>0$, metal $A^2$ and B comprises metal $B^1$ and, if $y>0$, metal $B^2$.

5. The method of claim 1 wherein the solution comprising a plurality of aqueous phase micelles comprises
    (a) a non-aqueous continuous phase comprising one or more non-polar solvents,
    (b) an emulsifier,
    (c) a co-emulsifier,
    (d) one or more water soluble compounds B having the Formula $B^{m+}X_m$ or hydrates thereof, wherein
        $B^{m+}$ is a metal B,
        m represents the valency of the metal B, and
        each X is independently an anion capable of imparting water solubility to the compound of formula $B^{m+}X_m$; and
    (e) one or more water soluble compounds A having the Formula $A^{n+}X_n$ or hydrates thereof, wherein
        $A^{n+}$ is a metal A,
        n represents the valency of the metal A, and
        each X is independently an anion capable of imparting water solubility to the compound of formula $A^{n+}X_n$;
and wherein the solution prior to adding the water soluble inorganic base has a pH of from 6.8 to 7.2.

6. The method of claim 5, further comprising:
    (1) providing the non-aqueous continuous phase;
    (2) providing an aqueous phase comprising the one or more compounds of Formula $B^{m+}X_m$ or hydrates thereof;

(3) combining the non-aqueous continuous phase and the aqueous phase to form the solution;

(4) adding the emulsifier to the non-aqueous continuous phase, the aqueous phase, or the solution;

(5) adding the co-emulsifier to the non-aqueous continuous phase, the aqueous phase, or the solution; and (6) adding the one or more metals $A^{n+}X_n$ or hydrates thereof to the solution resulting from steps (1)-(5).

7. The method of claim 6, wherein the aqueous phase comprising the one or more compounds of formula $B^{m+}X_m$ or hydrates thereof is an acidic aqueous solution, the method further comprising:

adjusting the pH of the biphase resulting from steps (1)-(5) with a water soluble inorganic base prior to step (6), wherein the pH is adjusted to from 10-12.

8. The method of claim 1, further comprising heating the solution to a temperature of from 5 to 100° C.

9. The method of claim 8, wherein the temperature is from 50 to 100° C.

10. The method of claim 1, wherein the one or more metals A is selected from the group consisting of Ba, Sr, Li, Ca and Pb.

11. The method of claim 1, wherein the one or more metals B is selected from the group consisting of Nb, Zr, and Ti.

12. The method of claim 11, wherein the compound of Formula $ABO_3$ is $BaTiO_3$ or $SrTiO_3$.

13. The method of claim 4, wherein $A^1$ is Ba, $A^2$ is Sr, $B^1$ and $B^2$ are both Ti, and $0.1 \leq x \leq 0.9$ 14. The method of claim 13, wherein the compound of Formula $A^1_{1-x}A^2_xB^1_{1-y}B^2_yO_3$ is $Ba_{0.7}Sr_{0.3}TiO_3$.

15. The method of claim 1, wherein the water soluble compounds of B is $Ti(OH)_4$ or a hydrate thereof.

16. The method of claim 7, wherein the acidic aqueous solution comprises hydrochloric acid, and the compound of Formula $B^{m+}X_m$ is $TiCl_4$.

17. The method of claim 5, wherein the one or more compounds of Formula $A^{n+}X_n$ are selected from the group consisting of $BaCl_2$ and $SrCl_2$ or hydrates thereof.

18. The method of claim 1, wherein the water soluble inorganic base is a compound of Formula DOH, wherein D is an alkali metal, and wherein the pH is adjusted such that the ratio of $OH^-$ in DOH to $B^{m+}$ in $B^{m+}X_m$ is from about 1.8 to about 2.2.

19. The method of claim 18, wherein the inorganic base is NaOH, and $B^{m+}$ is $Ti^{4+}$.

20. The method of claim 5, wherein non-polar solvent is cyclohexane, the emulsifier is a polyoxyethylene octyl phenyl ether, and the co-emulsifier iso-butanol.

21. The method of claim 5, wherein the compound of formula $ABO_3$ is selected from the group consisting of $BaTiO_3$, $Ba_{0.1}Sr_{0.9}TiO_3$, $Ba_{0.2}Sr_{0.8}TiO_3$, $Ba_{0.3}Sr_{0.7}TiO_3$, $Ba_{0.4}Sr_{0.6}TiO_3$, $Ba_{0.5}Sr_{0.5}TiO_3$, $Ba_{0.6}Sr_{0.4}TiO_3$, $Ba_{0.7}Sr_{0.3}TiO_3$, $Ba_{0.8}Sr_{0.2}TiO_3$, $Ba_{0.9}Sr_{0.1}TiO_3$, and $SrTiO_3$;

the non-polar solvent is cyclohexane, the emulsifier is polyoxyethylene octyl phenyl ether, the co-emulsifier iso-butanol;

the compound of Formula $B^{m+}X_m$ is $TiCl_4$;

the one or more compounds of Formula $A^{n+}X_n$ is selected from the group consisting of BaCl2 and SrCl2 or hydrates thereof;

the inorganic base is NaOH;

the temperature is from about 75 to about 85° C.; and wherein the pH is adjusted such that the ratio of $OH^-$ in NaOH to $Ti^{4+}$ in $TiCl_4$ is approximately 2.

* * * * *